(12) United States Patent
Kaufman et al.

(10) Patent No.: US 7,340,417 B2
(45) Date of Patent: Mar. 4, 2008

(54) SYSTEM AND METHOD FOR PROVIDING ABSORBENT PAPER PRODUCTS AND PACKAGING THEREFOR HAVING COORDINATED CONSUMER-SPECIFIED FEATURES

(75) Inventors: David P. Kaufman, Maumelle, AR (US); Timothy McFarland, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/037,801

(22) Filed: Jan. 18, 2005

(65) Prior Publication Data
US 2005/0123661 A1 Jun. 9, 2005

Related U.S. Application Data

(63) Continuation-in-part of application No. 10/039,076, filed on Dec. 31, 2001, now abandoned.

(51) Int. Cl.
G06Q 30/00 (2006.01)
(52) U.S. Cl. .......................................... 705/26; 705/37
(58) Field of Classification Search ................... 705/26
See application file for complete search history.

(56) References Cited

U.S. PATENT DOCUMENTS

| 6,167,383 | A | 12/2000 | Henson |
| 6,186,553 | B1 | 2/2001 | Phillips et al. |
| 6,594,642 | B1 | 7/2003 | Lemchen |
| 7,047,207 | B2 * | 5/2006 | Stavrulov ..................... 705/10 |
| 2002/0004749 | A1 * | 1/2002 | Froseth et al. ................ 705/16 |
| 2002/0103714 | A1 | 1/2002 | Froseth et al. |
| 2002/0046079 | A1 * | 4/2002 | Stavrulov ..................... 705/10 |
| 2002/0082745 | A1 | 6/2002 | Wilmott et al. |
| 2003/0035138 | A1 | 2/2003 | Schilling |

FOREIGN PATENT DOCUMENTS

WO WO 03/056895 A1 7/2003

OTHER PUBLICATIONS

Mark Gaughan, Nike Stop Promises Grand Gallery Views; [Final Edition], Buffalo News. Buffalo, N.Y.: Apr. 29, 1995, 4 pages.*
Vincent Canby, Film View; Pretty Soon, All You'll See Are Big Hits in Tiny Theaters, New York Times. (Late Edition (East Coast)). New York, N.Y.: Jan. 25, 1987, p. A. 17, 5 pages.*
"Puffs Design Selector", Excerpt from www.puffs.com dated Dec. 10, 2001, 2 pages.
"Design the Box Contest", Excerpt from www.crayola.com/puffs dated Dec. 11, 2001, 1 page.
"Reflect.com" web pages captured via the WayBackMachine (archieve.org) and dated Apr. 18, 2001.
"Proctor & Gamble's online beauty business blossoms;" CC News' Yarmouth: Jul. 2001.

* cited by examiner

Primary Examiner—James Zurita
(74) Attorney, Agent, or Firm—Armstrong Teasdale, LLP

(57) ABSTRACT

Methods and systems by which a consumer may select or specify coordinated features of an absorbent paper product and its packaging, such as a facial tissue or paper towel product, and then receive an absorbent paper product and packaging having the coordinated features selected or specified by the consumer.

14 Claims, 8 Drawing Sheets

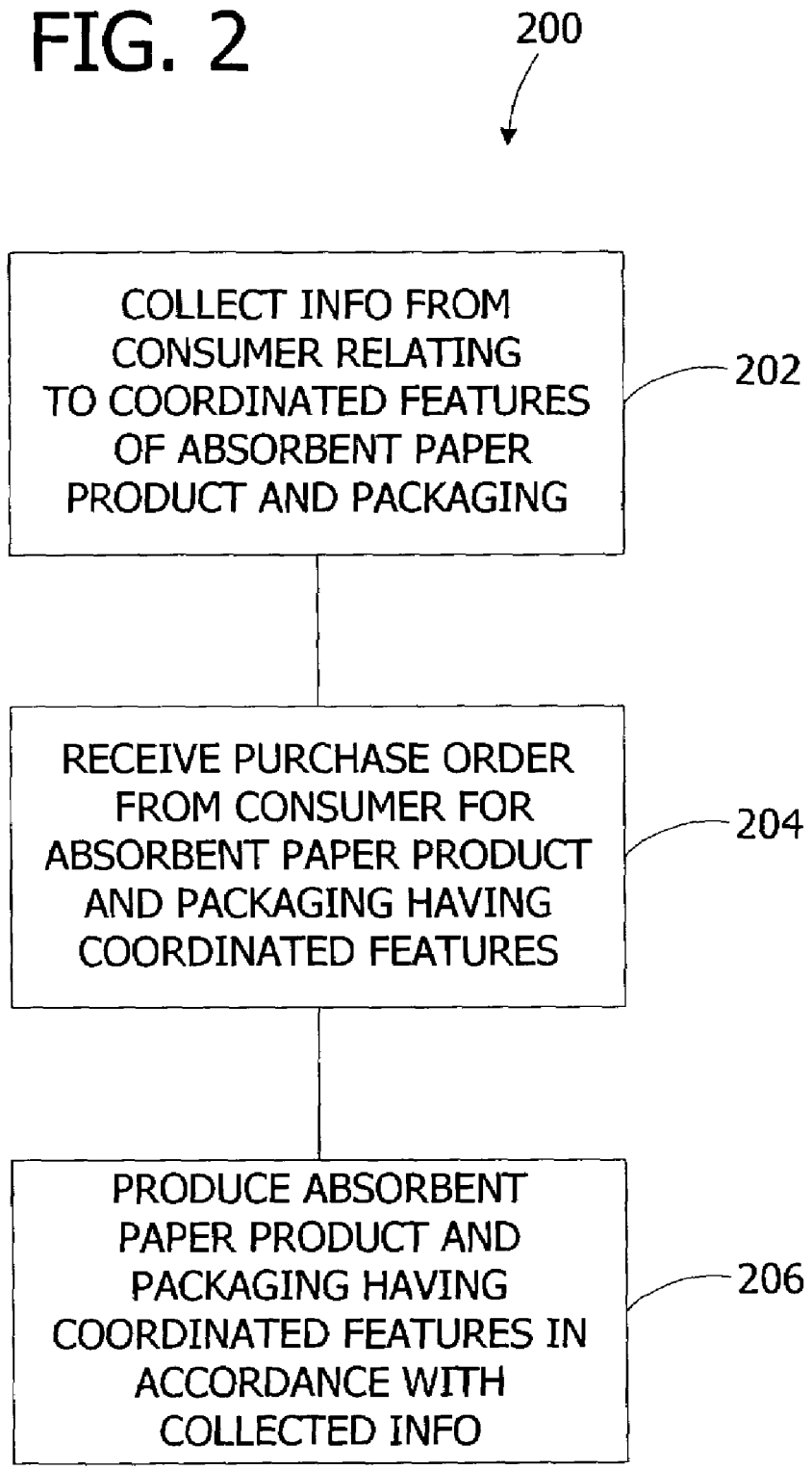

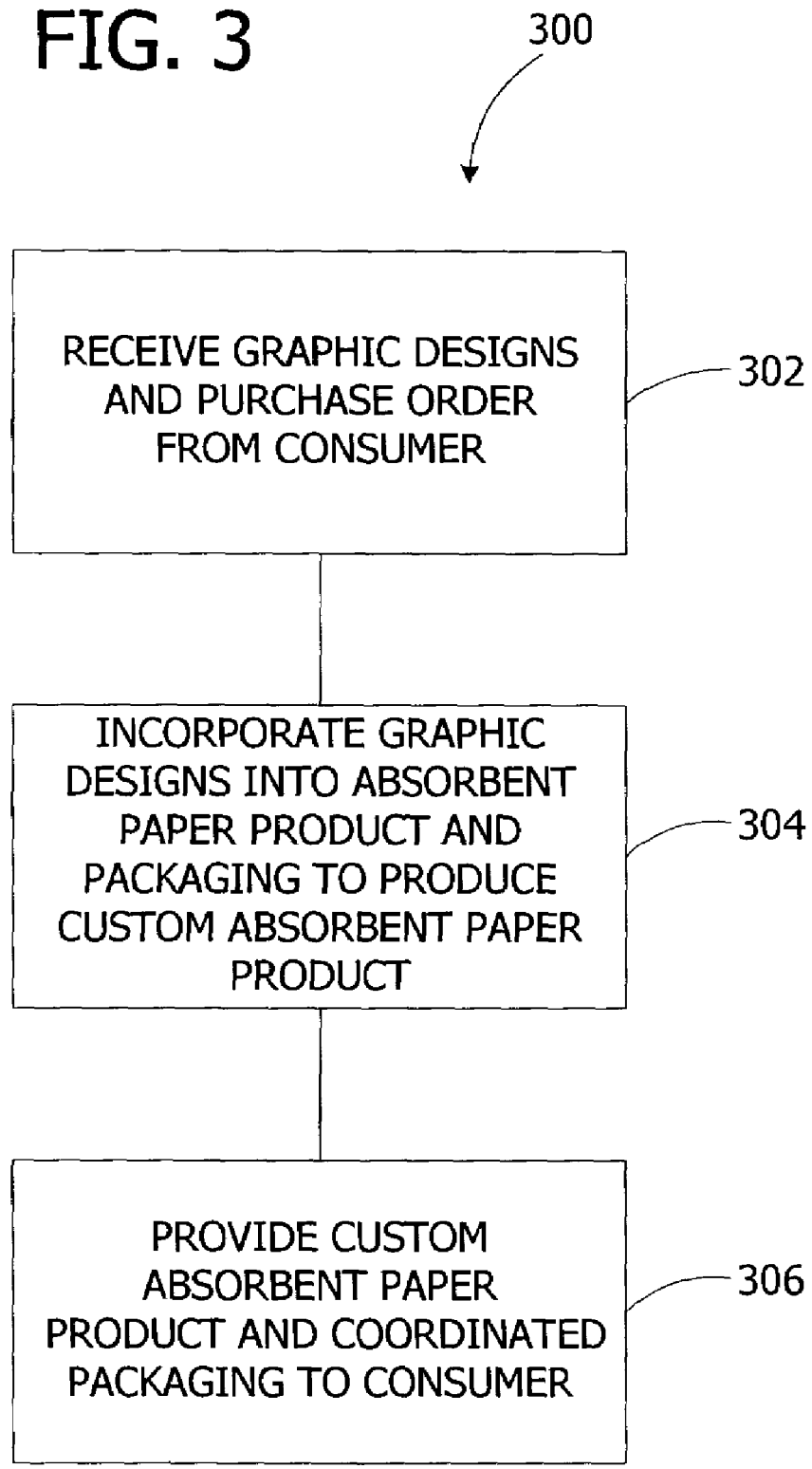

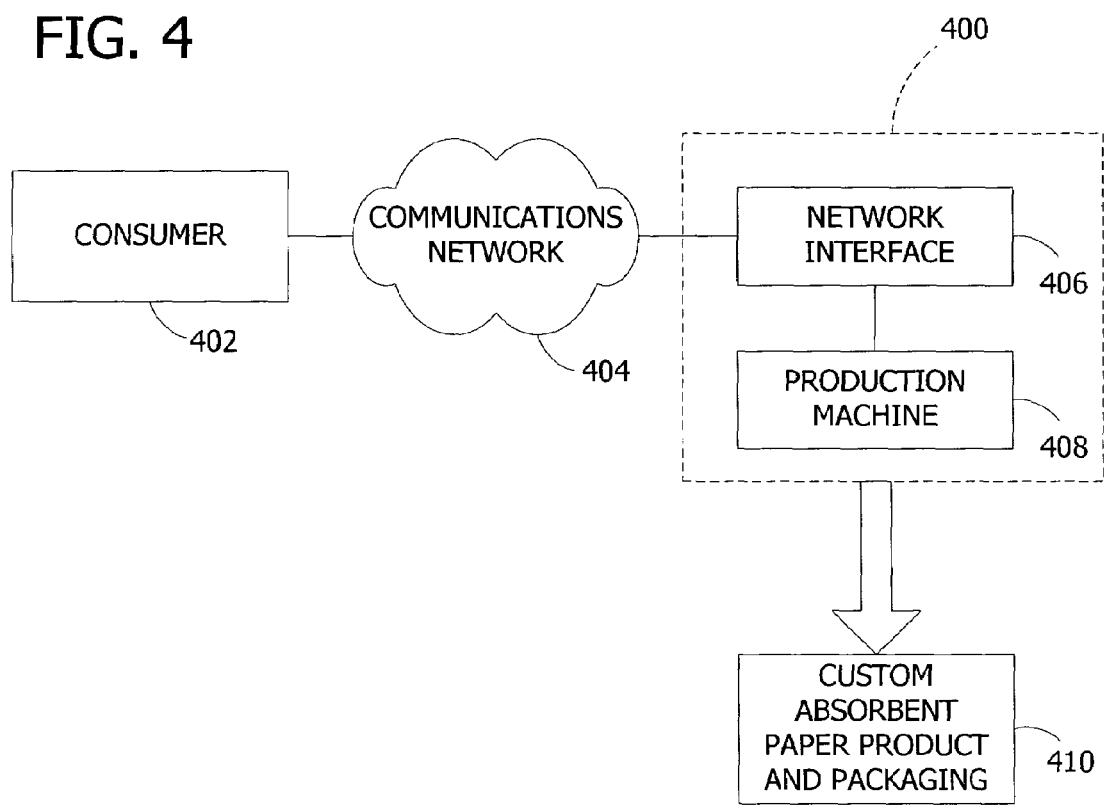

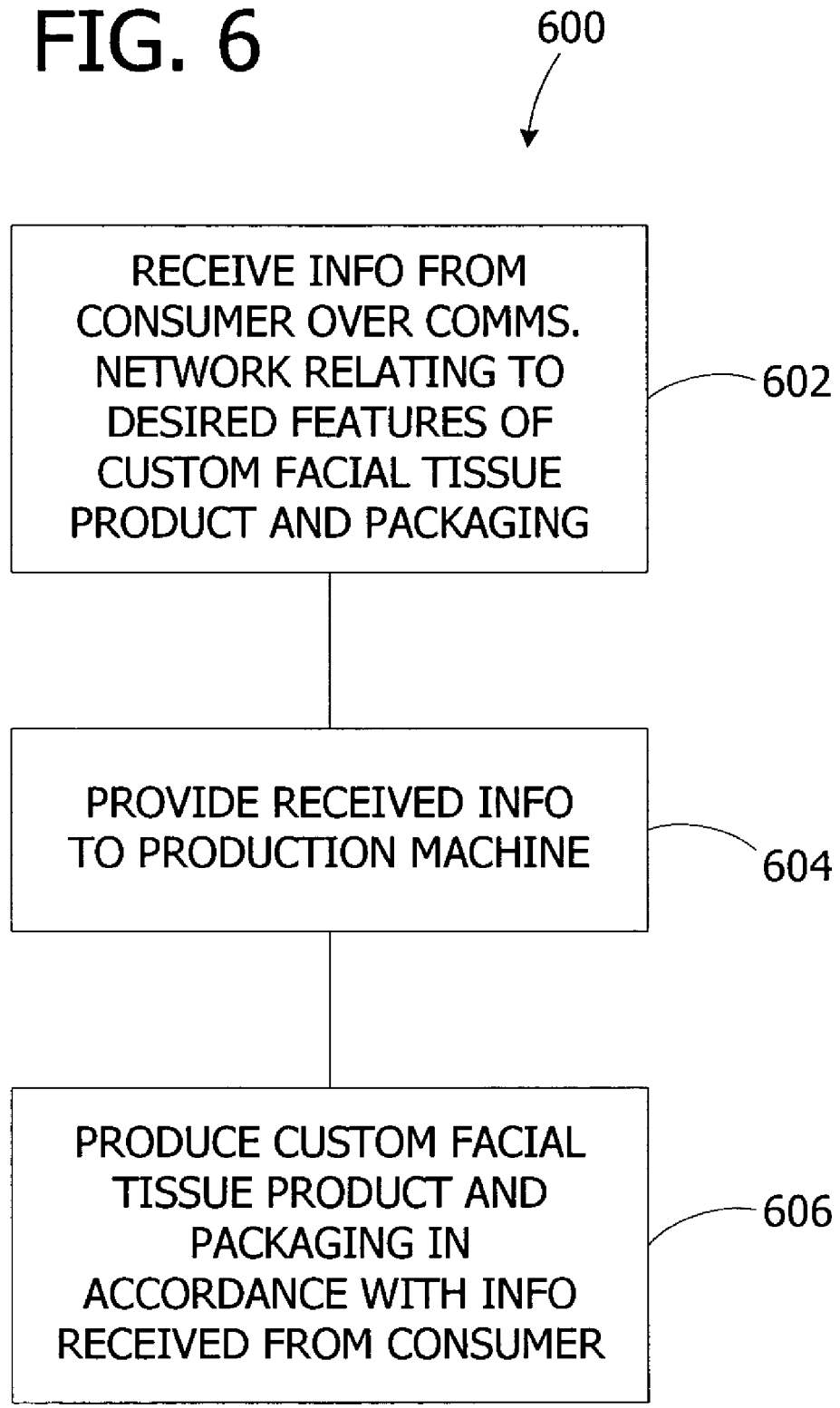

SYSTEM AND METHOD FOR PROVIDING ABSORBENT PAPER PRODUCTS AND PACKAGING THEREFOR HAVING COORDINATED CONSUMER-SPECIFIED FEATURES

FIELD OF THE INVENTION

The present invention relates generally to systems and methods for providing absorbent paper products and packaging therefor having features selected or otherwise specified by a consumer. In particular, the invention relates to systems and methods which permit a consumer to select and obtain products having a graphic design which is coordinated with a selected graphic design of packaging for the product, and visa versa.

BACKGROUND OF THE INVENTION

Absorbent paper products, such as facial tissue and paper towel products, are commonly provided with a variety of aesthetic and functional features. For example, facial tissue products are available in a number of colors, scents, styles (e.g., 2-ply, 3-ply, with or without lotion, etc.), quantities and packaging styles, and may also include floral or other graphic designs on the individual tissues or the packaging therefor. In general, however, these features are available in only a limited number of combinations. For instance, a facial tissue carton bearing a particular floral design might only be available with scented tissues, or tissues of a particular color, or a specific quantity of tissues. Thus, while a wide variety of aesthetic and functional features exist, a consumer must still choose from a relatively limited number of available feature combinations, and select a particular absorbent paper product whose combination of features most closely matches the consumer's preferences or needs.

As recognized by the inventors hereof, what is needed is a means by which consumers can individually select the coordinated features they desire in an absorbent paper product and its packaging, and then purchase absorbent paper products in packaging wherein both the products and packaging have the selected, coordinated features.

SUMMARY OF THE INVENTION

In order to solve these and other needs in the art, the inventors hereof have succeeded at designing methods and systems by which a consumer may select or specify certain optional, coordinated features of an absorbent paper product and its packaging, and then receive an absorbent paper product in packaging having the very features selected by the consumer. These optional, coordinated features may include, for example, the color, scent, size or shape of the product, as well as the graphic design of the product. Further, a consumer can preferably provide a graphic design (e.g., including text, photographic images, or other graphics) together with a purchase order for an absorbent paper product and its packaging, and then receive such a product in packaging, both of which bear the consumer's coordinated, selected graphic design. In this manner, consumers may purchase custom absorbent paper products which depict loved ones, slogans, company logos, sports teams and schedules, etc. These absorbent paper products may also be "made to order," either at the point of purchase or a remote location. In the latter case, consumers may provide information relating to desired product features over a communications network, such as a computer or telephony network, which information is then provided to a production machine for producing the specific product desired by the consumer.

In one form, the invention is a method in which a supplier customizes an absorbent paper product and customizes a packaging for the absorbent paper product for a consumer. A plurality of different graphic product designs for the absorbent paper product is identified. A plurality of different graphic package designs for the packaging of the absorbent paper product is identified. The product designs and the package designs are coordinated. A selected graphic product design and a selected package design coordinated with the selected product design is received from the consumer via a communications network. Alternatively, a selected graphic package design and a selected product design coordinated with the selected package design is received from the consumer via a communications network. The selected, coordinated graphic product and package designs are provided to a production machine coupled to the communications network. The production machine is configured to receive the selected designs provided by the consumer via the communications network. The production machine is configured to incorporate the selected graphic product design into a absorbent paper product and is configured to incorporate the selected graphic package design into packaging for the absorbent paper product. The custom absorbent paper product embodying the selected graphic product design and having the packaging embodying the selected graphic package design is produced by the production machine. The custom absorbent paper product embodying the selected graphic product design and having the packaging embodying the selected graphic package design is provided to the consumer.

In another form, the invention is a method in which a supplier provides to a consumer an absorbent paper product and a packaging therefor to order. The supplier collects information from the consumer through a telephony or computer communications network via a user interface, the information relating to a desired product feature of the absorbent paper product wherein the desired product feature includes a plurality of first options and wherein the information collected from the consumer identifies one of the plurality of first options. The supplier collects information from the consumer through the communications network via a user interface, the information relating to a desired package feature of the packaging for the absorbent paper product wherein the desired package feature includes a plurality of second options coordinated with the consumer identified first option, wherein the information collected from the consumer identifies one of the plurality of second options. The supplier receives a purchase order from the consumer for the absorbent paper product with the packaging wherein the purchase order specifies the identified first option and the identified second options. The supplier produces the absorbent paper product having the identified one of the plurality of first options and with the packaging having the identified one of the plurality of second options. The supplier provides to the consumer the produced absorbent paper product having the first option and with the packaging having the identified second option in accordance with the information collected from the consumer.

In another form, the invention is a system for use with a communications network. The system is used by a supplier for producing a custom absorbent paper product and a packaging therefor desired by a consumer. A network interface accessible to the consumer presents information to the consumer over the communications network, the information relating to a first option of a first plurality of first options of a product feature of the absorbent paper product desired by the consumer and a second option of a second plurality of second graphical options of a package feature of the packaging for the absorbent paper product. Each product feature has a coordinated package feature or wherein each package feature has a coordinate product feature, the network interface for receiving information from the consumer identifying a product feature and a coordinated package feature selected by the consumer or identifying a package feature and a coordinated product feature selected by the consumer. A production machine linked to the communications network is configured to receive the information provided by the consumer via the communications network. The production machine is configured to produce custom absorbent paper products including any one of the first plurality of options of the product feature and configured to produce packaging for the custom absorbent paper products including any one of the second plurality of options of the package feature. The production machine produces the custom absorbent paper product with the packaging as selected by the consumer and in accordance with the information such that the produced custom absorbent paper product includes the selected first option and the packaging for the produced custom absorbent paper product includes the selected second graphical option. A computer server is operatively connected to the production machine and the communications network. The computer server is configured to receive the information from the consumer via the communications network, and to provide the information to the production machine.

Other features and advantages of the present invention will be in part apparent and in part pointed out hereinafter.

BRIEF DESCRIPTION OF THE DRAWINGS

FIG. 2 is a flow diagram illustrating a method for producing an absorbent paper product to order according to another embodiment of the invention.

FIG. 3 is a flow diagram illustrating a method for customizing an absorbent paper product using a graphic design received from a consumer.

FIG. 4 is a block diagram of a system and related environment for producing an absorbent paper product using information provided by a consumer over a communications network.

FIG. 6 is a flow diagram illustrating a method for producing a custom facial tissue product using the system of FIG. 4.

Corresponding reference characters indicate corresponding features throughout the several views of the drawings.

DETAILED DESCRIPTION OF PREFERRED EMBODIMENTS

Figure 1A:
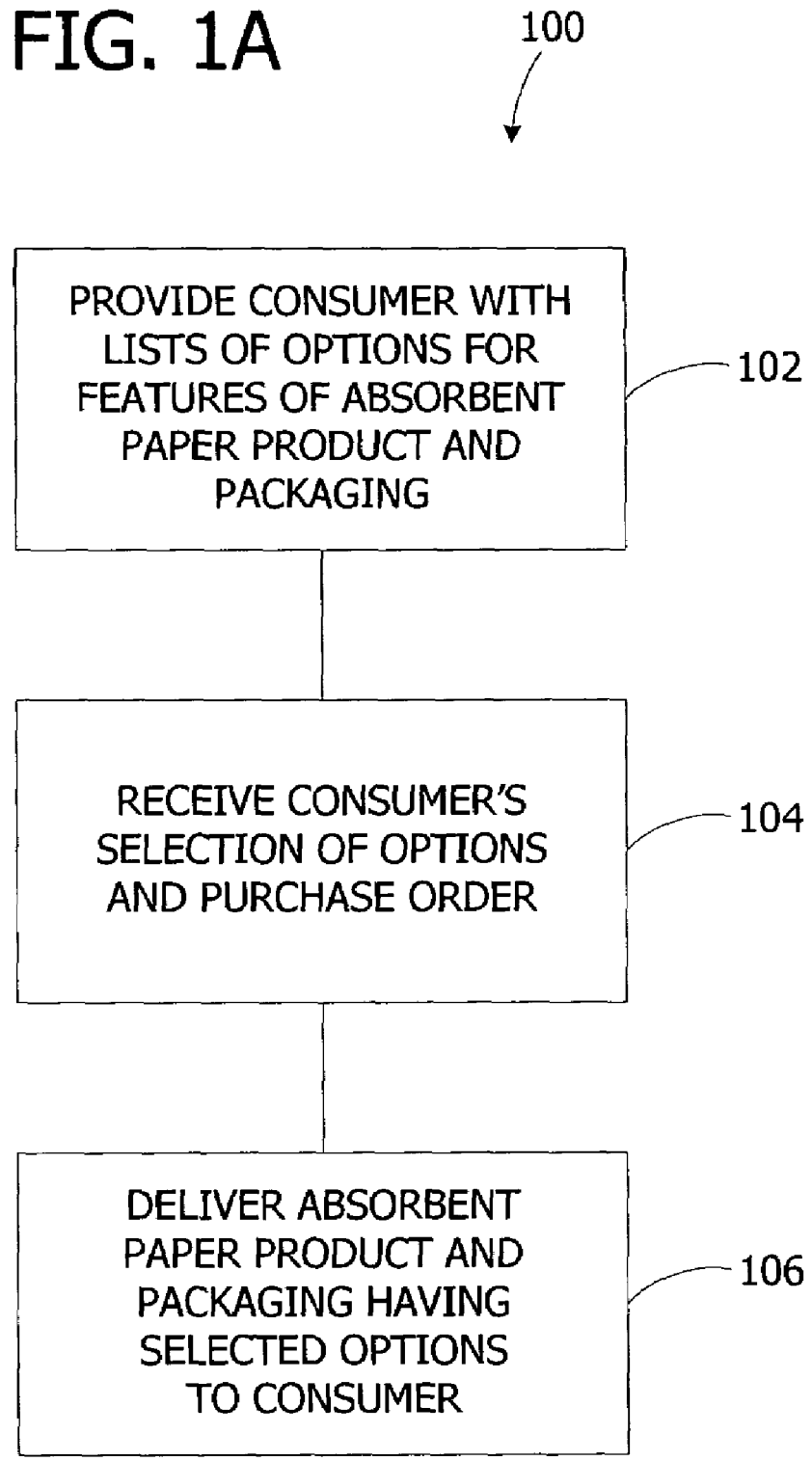
FIG. 1A is a flow diagram illustrating a method for providing a consumer with an absorbent paper product according to one embodiment of the present invention.

A method for providing a consumer with an absorbent paper product according to one preferred embodiment of the invention is illustrated in FIG. 1A and designated generally by reference character 100. In one preferred implementation, the absorbent paper product is a facial tissue product. However, as used herein, the phrase "absorbent paper product" shall include, without limitation, facial tissue, toilet tissue, paper towel, napkin, and baby wipe products, irrespective of the actual paper content (if any) of such products.

Beginning at block 102 of FIG. 1A, the consumer is first provided with a list of options for each of several features of an absorbent paper product and packaging. The optional features of the absorbent paper product and/or its packaging may include, for example, the individual product count (e.g., the number of facial tissues contained in a single package, such as six, twelve, one hundred, etc.), the style of the product (e.g., two-ply vs. three-ply, with or without lotion, etc.), the color of the product (preferably including single colors, groups of colors, multi-colored options, and no color, where applicable), the scent of the product and/or product packaging (preferably including an unscented option in addition to a variety of scents and aromas), the graphic design of the product and/or product packaging (preferably including several predefined graphic design options, a no graphic design option, and a graphic design provided by the consumer option), the shape of the product packaging (e.g., the shape of a facial tissue carton), the color of the product packaging, etc. Thus, with further reference to block 102, the consumer may be provided with a first list of options for a first feature of the absorbent paper product and/or its packaging (e.g., a list of available product colors) and a second list of options for a second feature of the product and/or its packaging (e.g., a list of available product scents). In fact, the consumer is preferably provided options for numerous and as many product and package features as possible, including those noted above, thereby allowing the consumer to design a potentially unique combination of such features which meets the consumer's individual tastes or needs. Preferably, when one than one option is available, the options are coordinated so that the consumer selects a plurality of options which are in some way synchronized, harmonized or otherwise matched in some way, directly or indirectly, so that the selections are in line with each other.

Figure 1B:
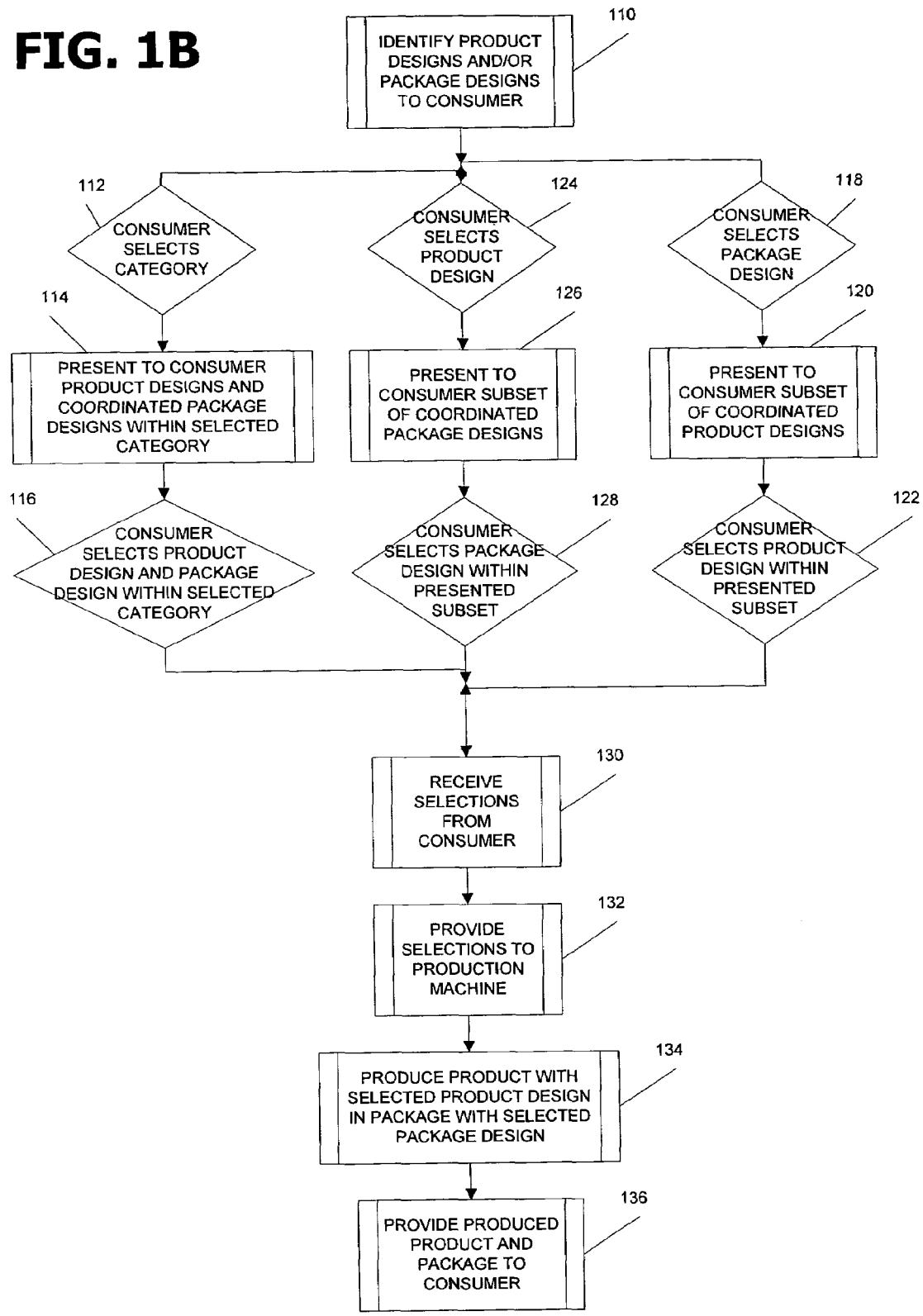
FIG. 1B is a flow diagram illustrating another method for providing a consumer with an absorbent paper product and coordinated package according to one embodiment of the present invention.

In one embodiment as illustrated in FIG. 1B, the package graphics and the product graphics are coordinated and the consumer's choices are limited to insure coordination. The consumer is presented with the option to choose coordinated graphics by one of several ways. For example, various product designs and package designs are presented to the consumer at 110. This may include presenting the consumer with various categories (e.g., flora, geometric, fauna, or other design). Depending on which category the consumer selects at 112, the consumer would be presented with a particular patterns in the category (daisies, roses, etc) at 114. The particular patterns presented would be coordinated with the category selected by the consumer at 112. Thus, the consumer's selection at 116 would result in coordinated graphics for the product and the package.

As another example, the consumer may be presented with various package designs (e.g., graphics) at 110. Depending on which package design the consumer chooses at 118, the consumer would be presented with particular (e.g., preselected) choices of product designs (e.g., tissue graphics) at 120 which coordinate with the package design selected at 118. The particular products designs presented to the consumer at 120 would be a subset of the entire product designs available and would be selected in advance as product designs which coordinate with the package design selected at 118. A product design may be in one or more subset corresponding to each package design. Each package design would have at least one product design subset corresponding thereto having coordinated product designs. In one embodiment, only product designs coordinated with the package design selected by the consumer at 118 would be presented at 120. Thus, the consumer's choice at 122 would result in coordinated graphics for the product and the package.

As another example, the consumer may be presented with various product designs (e.g., graphics) at 110. Depending on which product design the consumer chooses at 124, the consumer would be presented with particular (e.g., preselected) choices of package designs (e.g., box graphics) at 126 which coordinate with the product design selected at 124. The particular package designs presented to the consumer at 126 would be a subset of the entire package designs available and would be selected in advance as package designs which coordinate with the product design selected at 124. A package design may be in one or more subset corresponding to each product design. Each product design would have at least one package design subset corresponding thereto having coordinated package designs. In one embodiment, only package designs coordinated with the product design selected by the consumer at 124 would be presented at 126. Thus, the consumer's choice at 1228 would result in coordinated graphics for the product and the package.

Those skilled in the art will recognize other choices that may be presented to the consumer at 110 in order to coordinate the package graphics and the graphics of the product within the package. In addition, the consumer may be presented at any point along the decision process of FIG. 1B with options that relate to details of the product or package graphics, such as colors (e.g., primary, secondary, pastel, etc.), location on the product or package (e.g., border, centered, one-sided, two-sided, end panel), size (e.g., small, medium, large, etc.), line width (e.g., small, medium, large, etc.) or other aspects of the graphics. For example, if the product is an absorbent paper product such as a tissue, one option for tissue graphics may be a border which complements a certain type of package graphics, or visa versa.

Figure 1C:
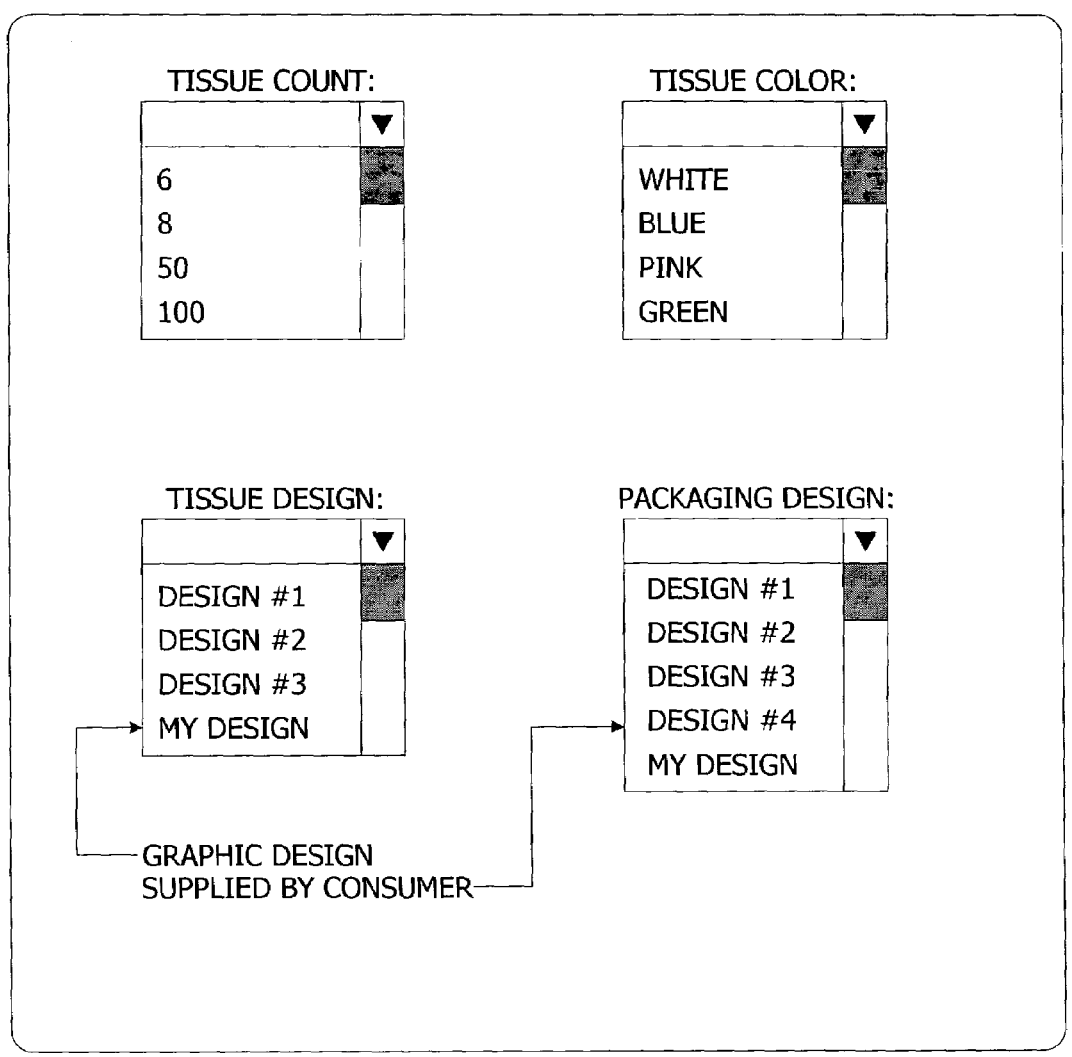
FIG. 1C illustrates a graphical user interface employing drop lists for several optional features of a facial tissue product.

The lists of optional product features may be provided to the consumer in block 102 in any suitable manner. For example, they may be presented to the consumer in printed form, read to the consumer via telephone, etc. In one implementation of the invention for facial tissue products, the lists of optional product features are displayed to the consumer on a computer via a graphical user interface employing drop lists for the optional product features, as illustrated generally in FIG. 1C. As an example, of coordinated designs, assume that tissue designs #1 and #3 are coordinated with packaging designs #1 and #3. Assume further that tissue design #2 is coordinated with packaging designs #2 and #4. If the consumer selects tissue design #1, only packaging designs #1 and #3 will appear in the packaging design drop list. If the consumer selects tissue design #3, only packaging designs #1 and #3 will appear in the packaging design drop list. If the consumer selects tissue design #2, only packaging designs #2 and #4 will appear in the packaging design drop list. Similarly, if the consumer packaging design #1, only tissue designs #1 and #3 will appear in the tissue design drop list. If the consumer selects packaging design #3, only tissue designs #1 and #3 will appear in the tissue design drop list. If the consumer selects packaging design #2, only tissue design #2 will appear in the tissue design drop list. If the consumer selects packaging design #4, only tissue design #2 will appear in the tissue design drop list.

As indicated in block 104 of FIG. 1A, the consumer's selections of available options are preferably received together with a purchase order for an absorbent paper product having the specific options selected by the consumer. This purchase order preferably includes payment or billing information, such as a credit card number for the consumer. The absorbent paper product is then delivered to the consumer, as indicated in block 106.

The actual mode of delivery employed in block 106 may take several forms, including hand-delivery of the product to the consumer at the point of purchase, depositing of the product for shipment to the consumer or to a proxy for the consumer, etc. As apparent to those skilled in the art, the mode of delivery will typically depend on the mode used for receiving a consumer's selections and purchase order. For example, if a consumer's selections and purchase order are received by mail, or over a communications network such as a telephony network or a computer network (e.g., the Internet), the ordered product may be shipped to the consumer via an overnight or express carrier. In the case where a consumer's order is placed in person, such as at a retail or other business establishment, an absorbent paper product having the options selected by the consumer may be delivered to the consumer on-the-spot, if available in sufficient time, or subsequently made available to the consumer for pick-up. Of course, any one of these or other delivery modes may be employed for any given transaction without departing from the scope of the invention.

In some applications, it may be desirable to preproduce absorbent paper products with each possible combination of features so these products are immediately available for delivery to a consumer, once ordered. However, this will not be practicable in many applications of the invention, including those where options are offered for numerous product features, where a consumer orders a product embodying a graphic design provided by the consumer, etc. In these and other situations, it may be preferably to produce the absorbent paper product on a made to order basis using the method 200 shown in FIG. 2.

With reference to block 202 of FIG. 2, information is collected from a consumer relating to one or more coordinated features of an absorbent paper product and packaging. A purchase order for an absorbent paper product and its packaging having the one or more coordinated features desired by the consumer is also received, as indicated in block 204 of FIG. 2. Then, in block 206, the absorbent paper product and packaging having the one or more coordinated features desired by the consumer is produced in accordance with the information collected from the consumer. As will be apparent to those skilled in the art, this made to order approach may be implemented in a retail or other establishment, including in a specialty store specializing in the particular type of absorbent paper product and packaging in question, in a (preferably automated) kiosk located in a shopping mall or other high traffic area, etc. In this manner, a custom product may be made available to the consumer in a matter of minutes, or hours. Alternatively, the method 200 may be implemented remotely from the consumer, in which case the purchase order and the information relating to the one or more features desired by the consumer are preferably obtained from the consumer by mail, or through a telephony or computer network.

FIG. 3 illustrates a related method 300 in which a graphic design and a purchase order for an absorbent paper product embodying the graphic designs are received from a consumer in block 302. This graphic design may be, for example, a photograph of someone or something which the consumer would like to have printed or otherwise applied to facial tissues and/or facial tissue packaging. However, as used herein, "graphic design" shall include, without limitation, computer scanned images, drawings, photographs, logos, words, phrases and any combination thereof, as well as single color graphic designs, multi-color (including black and white) graphic designs, and any combination thereof. The graphic design(s) received from the consumer are then incorporated into an absorbent paper product and packaging (i.e., the product itself and/or the packaging therefor) to thereby produce a custom absorbent paper product and packaging desired by the consumer, as indicated in block 304. Preferably, the consumer's graphic design is incorporated into the product and packaging to the fullest extent possible. In certain cases, however, the graphic design may exceed the available space on the product, or may utilize non-available colors, or may not be coordinated, etc. Under these circumstances, the consumer's graphic design may be only partially incorporated into the custom absorbent paper product. At block 306, the custom absorbent paper product and packaging embodying the consumer's graphic designs are provided to the consumer. In at least one preferred embodiment, the custom absorbent paper product and/or package is provided only to the consumer from whom the graphical design and purchase order were received.

A preferred system 400 for producing an absorbent paper product based on information received from a consumer 402 over a communications network 404 is illustrated generally in FIG. 4. As shown therein, the system 400 preferably includes a network interface 406 and a production machine 408. The network interface is provided to receive information from the consumer relating to one or more optional features of the absorbent paper product desired by the consumer 402, and to provide such information to the production machine 408. The network interface may also be responsible for processing the consumer's payment or billing information, if desired. Upon receiving the information from the network interface 406, the production machine 408 produces the custom absorbent paper product and packaging 410, preferably automatically, as indicated generally in FIG. 4.

In the case where the communications network 404 represents a telephony network over which the consumer 402 may place an order for the custom product by phone, the network interface 406 is preferably an automated voice attendant or interactive voice response (IVR) system. Alternatively, a live attendant or other form of network interface 406 may be employed.

Figure 5:
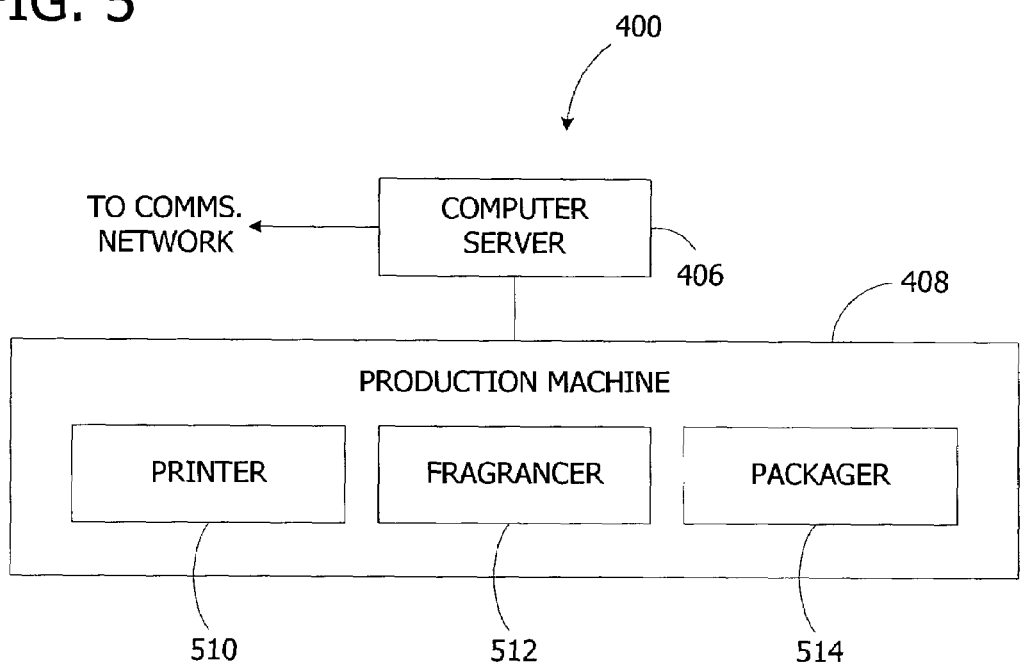
FIG. 5 is a block diagram illustrating an exemplary implementation of the system of FIG. 4.

FIG. 5 illustrates one preferred implementation of the system 400 of FIG. 4 when the communications network 404 is a computer network such as the Internet. As shown in FIG. 5, the network interface 406 is preferably a computer server (e.g., a Web server hosting a web site through which consumers can place purchase orders). Additionally, the production machine 408 preferably includes at least one programmable printer 510, fragrancer 512, and packager 514. Upon receiving information electronically from the computer server 406 identifying the specific product features desired by a consumer, the production machine may apply a graphic design selected by the consumer (including a graphic design provided by the consumer, as disclosed above) to the custom product via the printer 510, as well as a scent selected by the consumer (if any) via the fragrancer 512. The custom product, which may include the individual product as well as packaging therefor, is then assembled (preferably automatically) via the packager 514, which may also label the custom product for shipment or other form of delivery to the consumer.

FIG. 6 illustrates an exemplary method 600 for producing a custom facial tissue product using a system of the type shown in FIG. 4. Beginning at block 602 of FIG. 6, information is received from a consumer over a communications network which relates to optional features of a custom facial tissue product and packaging desired by the consumer. These optional features may include tissue count, tissue style, tissue color, tissue scent, tissue graphic design, tissue packaging style (e.g., upright cartons, family size cartons, travel size or pocket packages, etc.), tissue packaging color and tissue packaging graphic design. In block 604, the information received in block 602 is provided to a production machine. The custom facial tissue product and packaging are then produced in accordance with the information received from the consumer and provided to the production machine, as indicated in block 606.

As an example, a consumer may select a first graphic design to be embodied on the facial tissues, and a second graphic design to be embodied on packaging for the facial tissues. The consumer may also select a scent for the facial tissues. Thus, upon receiving this information provided by the consumer, the production machine 408 (e.g., an interfolder) will preferably print the first graphic design selected by the consumer on a quantity of facial tissues (which quantity may also be specified by the consumer) via the printer 510 shown in FIG. 5 (preferably along the borders or edges of the facial tissue), as well as print the second graphic design selected by the consumer on packaging for the facial tissues (e.g., a facial tissue carton), either via the printer 510 or, more preferably, an additional printer (including an additional printer associated with the packager 514). Note that the specific locations on the facial tissues and the packaging where the selected graphic designs are incorporated, in this example via printing, may be predefined by the system and/or selected by the consumer. The production machine may then apply the selected scent to the facial tissues, the packaging for the facial tissues, or both, via the fragrancer 512. The facial tissues and packaging may then be assembled together via the packager 514, and preferably labeled for shipping to the consumer.

Among other things, the present invention allows for the ordering and production of facial tissue products and packaging and other absorbent paper products having various combinations of features with are coordinated. For example, a consumer may desire to have graphic designs relating to his favorite sports team applied to a facial tissue carton and tissue. In particular, the invention allows a consumer to provide her own design graphic by scanning in pictures and scanning or typing in words or phrases to be applied to the absorbent paper product. For example, a new mother may wish to scan a picture of her baby to be applied to a facial tissue carton and choose the phrase "It's a Girl!" from a list of predetermined design graphics to be applied to the tissue. The consumer may further select a pink background for the carton, a pink tissue, and a "baby powder" scent for the tissue. As another example, a couple may wish to order pocket-size facial tissue packages with their names and wedding date printed on the tissues for distributing to their wedding guests.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method in which a supplier provides to a consumer at least one of facial tissue, toilet tissue, paper towel, napkin, and baby wipe products and a packaging therefor to order, the method comprising the supplier:

providing a production machine for manufacturing at least one of facial tissue, toilet tissue, paper towel, napkin, and baby wipe products;

defining a plurality of product features of the at least one of facial tissue, toilet tissue, paper towel, napkin, and baby wipe products to be manufactured by the production machine;

defining a plurality of package features of the packaging for the at least one of facial tissue, toilet tissue, paper towel, napkin, and baby wipe products to be manufactured by the production machine;

collecting information from the consumer through a telephony or computer communications network via a user interface, the information relating to at least one of the defined product features of the at least one of facial tissue, toilet tissue, paper towel, napkin, and baby wipe products, said product feature including a plurality of first options and said information collected from the consumer identifying one of the plurality of first options;

collecting information from the consumer through the communications network via a user interface, the information relating to at least one of the defined package features of the packaging for the at least one of facial tissue, toilet tissue, paper towel, napkin, and baby wipe products, said package feature including a plurality of second options coordinated with the consumer identified first option, said information collected from the consumer identifying one of the plurality of second options;

receiving a purchase order from the consumer for the at least one of facial tissue, toilet tissue, paper towel, napkin, and baby wipe products with the packaging, said purchase order specifying the identified first option and the identified second options;

producing, by the provided production machine, the at least one of facial tissue, toilet tissue, paper towel, napkin, and baby wipe products having the identified one of the plurality of first options and with the packaging having the identified one of the plurality of second options; and providing to the consumer the produced at least one of facial tissue, toilet tissue, paper towel, napkin, and baby wipe products having the identified first option and with the packaging having the identified second option in accordance with the information collected from the consumer.

2. The method of claim 1 wherein the produced at least one of facial tissue, toilet tissue, paper towel, napkin, and baby wipe products embodies a graphic product design associated with the identified first option and the packaging embodies a graphic package design associated with the identified second option.

3. The method of claim 1, said product features and said package features being organized by categories so that each selected product feature and its coordinated package features are in the same category or so that each selected package feature and its coordinated product features are in the same category, said consumer selecting a category, and said consumer selecting a product feature and a package feature within the selected category whereby the product features and the package features of the same category are coordinated so that the product features and the package features are in some way synchronized, harmonized or otherwise matched in some way, directly or indirectly, so that the product features and the package features are in line with each other.

4. The method of claim 1, each said product feature being coordinated with a pre-selected subset of the plurality of package features and said consumer selecting a product feature and selecting a package feature from the pre-selected subset of the plurality of package features coordinated with the selected product feature whereby the product feature and the pre-selected subset of the plurality of package features are coordinated so that the product feature and the pre-selected subset of the plurality of package features are in some way synchronized, harmonized or otherwise matched in some way, directly or indirectly, so that the product feature and the pre-selected subset of the plurality of package features are in line with each other.

5. The method of claim 1, said each package feature is coordinated with a pre-selected subset of the plurality of product features and said consumer selecting a package feature and selecting a product feature from the pre-selected subset of the plurality of product features coordinated with the selected package feature.

6. The method of claim 1, said at least one of feature categories, product features and package features being identified to the consumer, said at least one of one of the categories, one of the product features and one of the package features being received from the consumer, a subset of the received categories, product features and package features being identified to the consumer and said one of the identified subset being received from the consumer.

7. A system for use with a communications network, said system being used by a supplier for producing a at least one of facial tissue, toilet tissue, paper towel, napkin, and baby wipe products and a packaging therefor desired by a consumer, said system comprising:

a network interface accessible to the consumer for presenting information to the consumer over the communications network, said information relating to a first option of a first plurality of first options of at least one a plurality of defined product features of the at least one of facial tissue, toilet tissue, paper towel, napkin, and baby wipe products desired by the consumer and a second option of a second plurality of second graphical options of at least one of a plurality of defined package features of the packaging for the at least one of facial tissue, toilet tissue, paper towel, napkin, and baby wipe products, said each defined product feature having a defined coordinated package feature or said each defined package feature having a defined coordinate product feature, said network interface for receiving information from the consumer identifying a product feature and a coordinated package feature selected by the consumer or identifying a package feature and a coordinated product feature selected by the consumer;

a production machine linked to the communications network and configured to receive the information provided by the consumer via the communications network, said production machine configured to produce at least one of facial tissue, toilet tissue, paper towel, napkin, and baby wipe products including any one of the first plurality of options of the identified product feature and configured to produce packaging for the at least one of facial tissue, toilet tissue, paper towel, napkin, and baby wipe products including any one of the second plurality of options of the identified package feature, said production machine producing the at least one of facial tissue, toilet tissue, paper towel, napkin, and baby wipe products with the packaging as selected by the consumer and in accordance with said information such that the produced at least one of facial tissue, toilet tissue, paper towel, napkin, and baby wipe products includes the selected first option and the packaging for the produced at least one of facial tissue, toilet tissue, paper towel, napkin, and baby wipe products includes the selected second graphical option; and a computer server operatively connected to the production machine and the communications network, said computer server being configured to receive said information from the consumer via the communications network, and to provide said information to the production machine.

8. The system of claim 7 further comprising a purchase order received by the supplier from said consumer for a at least one of facial tissue, toilet tissue, paper towel, napkin, and baby wipe products embodying the selected graphic product design and having packaging embodying the selected graphic package design.

9. The system of claim 7, said products features and said package features being organized by categories so that each selected product feature and its coordinated package features are in the same category or so that each selected package feature and its coordinated product features are in the same category and said selected product feature and said selected package feature selected are within a selected category whereby the product features and the package features of the same category are coordinated so that the product features and the package features are in some way synchronized, harmonized or otherwise matched in some way, directly or indirectly, so that the product features and the package features are in line with each other.

10. The system of claim 7, each said product feature being coordinated with a pre-selected subset of the plurality of package features and said selected package feature being from the pre-selected subset of the plurality of package features coordinated with the selected product feature whereby the product feature and the pre-selected subset of the plurality of package features are coordinated so that the product feature and the pre-selected subset of the plurality of package features are in some way synchronized, harmonized or otherwise matched in some way, directly or indirectly, so that the product feature and the pre-selected subset of the plurality of package features are in line with each other.

11. The system of claim 7, each said package feature being coordinated with a pre-selected subset of the plurality of product features and said selected product feature being from the pre-selected subset of the plurality of product features coordinated with the selected package feature.

12. The system of claim 7, said at least one of feature categories, product features and package features being identified to the consumer, said at least one of one of the categories, one of the product features and one of the package features being received from the consumer, a subset of the received categories, product features and package features being identified to the consumer and said one of the identified subset being received from the consumer.

13. A method in which a supplier provides to a consumer an at least one of facial tissue, toilet tissue, paper towel, napkin, and baby wipe products and a packaging therefor to order, the method comprising the supplier:

providing a production machine for manufacturing at least one of facial tissue, toilet tissue, paper towel, napkin, and baby wipe products;

defining a plurality of product features of the at least one of facial tissue, toilet tissue, paper towel, napkin, and baby wipe products to be manufactured by the production machine;

defining a plurality of package features of the packaging for the at least one of facial tissue, toilet tissue, paper towel, napkin, and baby wipe products to be manufactured by the production machine;

collecting information from the consumer through a telephony or computer communications network via a user interface, the information relating to a desired graphic product design of the at least one of facial tissue, toilet tissue, paper towel, napkin, and baby wipe products;

collecting information from the consumer through the communications network via a user interface, the information relating to a desired graphic package design of the packaging for the at least one of facial tissue, toilet tissue, paper towel, napkin, and baby wipe products, said desired graphic package design being coordinated with the identified graphic product design;

receiving a purchase order from the consumer for the at least one of facial tissue, toilet tissue, paper towel, napkin, and baby wipe products embodying the selected graphic product design and having packaging embodying the selected graphic package design;

producing the at least one of facial tissue, toilet tissue, paper towel, napkin, and baby wipe products embodying the selected graphic product design and having packaging embodying the selected graphic package design; and providing to the consumer the produced at least one of facial tissue, toilet tissue, paper towel, napkin, and baby wipe products embodying the selected graphic product design and having packaging embodying the selected graphic package design in accordance with the information collected from the consumer.

14. A system for use with a communications network, said system being used by a supplier for producing a at least one of facial tissue, toilet tissue, paper towel, napkin, and baby wipe products and a packaging therefor desired by a consumer, said system comprising:

a network interface accessible to the consumer for presenting information to the consumer over the communications network, said information relating to a graphic product design of the at least one of facial tissue, toilet tissue, paper towel, napkin, and baby wipe products desired by the consumer and a graphic package design of the packaging for the at least one of facial tissue, toilet tissue, paper towel, napkin, and baby wipe products, said each graphic product design having a coordinated graphic package design or said each graphic package design having a coordinated graphic product design, said network interface receiving information from the consumer identifying a graphic product design and a coordinated graphic package design selected by the consumer or identifying a graphic package design and a coordinated graphic product design selected by the consumer;

a production machine linked to the communications network and configured to receive the information provided by the consumer via the communications network, said production machine configured to produce at least one of facial tissue, toilet tissue, paper towel, napkin, and baby wipe products embodying the selected graphic product design and configured to produce packaging embodying the selected graphic package design for the at least one of facial tissue, toilet tissue, paper towel, napkin, and baby wipe products, said production machine producing the at least one of facial tissue, toilet tissue, paper towel, napkin, and baby wipe products, with the packaging as selected by the consumer and in accordance with said information such that the produced at least one of facial tissue, toilet tissue, paper towel, napkin, and baby wipe products embodies the selected graphic product design and the packaging for the produced at least one of facial tissue, toilet tissue, paper towel, napkin, and baby wipe products embodies the selected graphic package design; and a computer server operatively connected to the production machine and the communications network, said computer server being configured to receive said information from the consumer via the communications network, and to provide said information to the production machine.

* * * * *